(12) United States Patent
Esch et al.

(10) Patent No.: US 7,809,449 B2
(45) Date of Patent: Oct. 5, 2010

(54) COUPLING OF SAFE FIELDBUS SYSTEMS

(75) Inventors: Rainer Esch, Blomberg (DE);
Heinz-Carsten Landwehr, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 419 days.

(21) Appl. No.: 11/368,325

(22) Filed: Mar. 3, 2006

(65) Prior Publication Data

US 2006/0229737 A1 Oct. 12, 2006

(30) Foreign Application Priority Data

Mar. 7, 2005 (DE) .................. 10 2005 010 820

(51) Int. Cl.
*G05B 11/10* (2006.01)
*G05B 19/18* (2006.01)
*G05B 9/02* (2006.01)
*G06F 11/00* (2006.01)

(52) U.S. Cl. ............... 700/21; 700/7; 700/18; 700/79; 710/305; 714/11; 370/352; 370/447

(58) Field of Classification Search .......... None
See application file for complete search history.

(56) References Cited

U.S. PATENT DOCUMENTS

| | | | | |
|---|---|---|---|---|
| 4,528,662 A * | 7/1985 | Floyd et al. | ........ | 370/216 |
| 5,450,398 A * | 9/1995 | Abefelt et al. | ........ | 370/352 |
| 5,706,007 A * | 1/1998 | Fragnito et al. | ........ | 341/155 |
| 6,128,689 A * | 10/2000 | Hassbjer et al. | ........ | 710/305 |
| 6,629,178 B1 * | 9/2003 | Smith | ........ | 710/240 |
| 6,823,251 B1 * | 11/2004 | Giers | ........ | 701/76 |
| 6,907,542 B2 * | 6/2005 | Barthel | ........ | 714/4 |
| 6,999,824 B2 * | 2/2006 | Glanzer et al. | ........ | 700/18 |
| 7,051,143 B2 * | 5/2006 | White et al. | ........ | 710/305 |
| 7,076,310 B2 * | 7/2006 | Fehrer et al. | ........ | 700/1 |
| 7,079,857 B2 * | 7/2006 | Maggenti et al. | ........ | 370/447 |
| 7,295,442 B2 * | 11/2007 | Garnett et al. | ........ | 361/728 |
| 7,453,902 B2 * | 11/2008 | Barthel et al. | ........ | 370/447 |
| 2002/0010874 A1 * | 1/2002 | Barthel | ........ | 714/4 |
| 2002/0129042 A1 * | 9/2002 | Bradshaw et al. | ........ | 707/200 |

(Continued)

FOREIGN PATENT DOCUMENTS

DE 100 65 907 A1 9/2002

(Continued)

OTHER PUBLICATIONS

Marcos et al., "On the Design and Development of a Gateway Between MAP/MMS and Profibus/FMS," Proceedings IEEE International Workshop on Factory Communications Systems, Seiten 349-353 (1997).

*Primary Examiner*—Albert DeCady
*Assistant Examiner*—Sunray R Chang (57) ABSTRACT

Generally, a means for coupling widely differing fieldbus or network systems to their own respective safety mechanisms is provided, in such a way as to ensure the transmission of safety data between at least two bus/network systems with different safety mechanisms.

A method and an apparatus are provided for coupling at least two (field)bus/network systems to respectively different safety mechanisms, in particular respective proprietary safety mechanisms, with safety data which is to be transmitted between the different system-based safety mechanisms being processed additionally using a safe data structure which is defined but is system-independent.

22 Claims, 4 Drawing Sheets

U.S. PATENT DOCUMENTS

2004/0199837 A1* 10/2004 Meyer-Grafe et al. ....... 714/712
2006/0190094 A1* 8/2006 Gehlen et al. .................. 700/1
2008/0126636 A1* 5/2008 Lehzen ....................... 710/105

FOREIGN PATENT DOCUMENTS

| DE | 102 51 502 A1 | 6/2004 |
|---|---|---|
| EP | 1 193 949 A2 | 4/2002 |
| WO | WO 03/023561 A2 | 3/2003 |
| WO | WO 2005/019952 A1 | 3/2005 |

* cited by examiner

COUPLING OF SAFE FIELDBUS SYSTEMS

The invention relates to a method and to an apparatus, which is designed to carry out the method, for coupling at least (field)bus/network systems having different safety mechanisms in order to process safety-relevant or safety-critical data.

For the purposes of the invention, the expressions safety-relevant data and safety-critical data, which are referred to in general in the following description and in the claims as safety data, means data which is respectively relevant and critical to the control of safety-relevant or safety-critical processes or process elements which, when a fault occurs, result in a hazard to people and/or to material goods as well which cannot be ignored, so that a subsequent process which is coupled to this process, and/or a system which includes this process must be changed to a safe state.

Examples of processes such as these are chemical processes in which it is essential to maintain critical parameters within a specified range, complex machine control systems, for example in the case of a hydraulic press or a production line, in which, for example, the starting up of a press/cutting tool can represent a safety-relevant process element. Further examples of safety-relevant processes and process elements are the monitoring of guard gratings, guard doors or light barriers, the control of two-handed switches, or else the reaction to emergency-off switches.

It is therefore absolutely essential for the respectively associated safety data that is produced or recorded and/or measured to be transported in real time without any corruption.

In order to satisfy the safety requirements, numerous agreements have been reached in recent years which require that data be transported with virtually no errors when using bus systems. These agreements relate in particular to the data transport itself and to the permissible residual error probability as a function of the respective application and/or of the respective process. Relevant standards that may be quoted in this case include, in particular, EN 61508 and EN 954-1 as well as GS-ET-26 relating to the principles for testing and certification of "Bus systems for the transmission of safety-relevant messages" from the German Test and Certification Center of the Industrial Professional Societies.

In accordance with these agreements and standards, specific safety mechanisms have been developed for each of these individual bus/network systems, in order to transmit safety data with a high level of redundancy. Possible errors are detected in good time, and any hazard can be avoided. Examples of this include, inter alia, the Safety Bus P, Profibus F, Interbus Safety, CAN Safety and the like.

These specific safety mechanisms, which have been developed in this case in particular for the purposes of control and automation, thus allow simple and low-cost retrofitting of the respectively already existing (field)bus/network systems which are used for data communication between individual units involved in a process for the transmission of safety data, in particular between sensors, actuators and/or control devices.

By way of example, EP 1 188 096 B1 discloses a control system for a safety-relevant process with a field bus, via which a control unit for controlling the safety-relevant process and a signaling unit which is linked to the safety-relevant process via I/O channels are connected. In order to ensure error-free communication with one another, these units have safety-related devices by means of which units which are intrinsically not safe are intended to become safe units. In detail, a multiple-channel processing structure which is provided by a computer is provided, in which case an error in a processing channel can be identified, and possibly corrected, on the basis of a result which is not the same as that of another redundant processing channel.

In the following text, the general expression computer essentially means any type of data processing devices such as microcomputers, microprocessors, microcontrollers or else PCs.

WO 01/15385 A2 also relates to the control of safety-relevant processes using a (field)bus system based on a safety mechanism, in which the units involved in the control of the safety-relevant process once again generally have redundant processing channels. Each of the redundant channels has a computer, and these computers monitor one another. This multiple-channel structure is changed to a single-channel structure by means of a further computer, which is connected to the fieldbus.

WO 01/15391 A1 and Laid-Open Specification DE 199 39 567 A1 disclose further examples of safe bus subscribers. A safety mechanism is provided with redundant processing channels and/or computers which monitor one another with respect to safe protocol creation, with a subsequent change from the two-channel system to the single-channel system via a further computer which is coupled to the bus, is connected to a protocol chip or has this integrated in it.

Patent Specification DE 195 32 639 C2, which relates to a further device for single-channel transmission of data which is formed by means of two redundant computers, integrates the function of bus coupling into one of the two redundant computers, in order to reduce the circuit complexity.

Furthermore, DE 100 65 907 A1 discloses a safety mechanism which is based on the principle of "redundancy with cross-comparison", for protected data transport for data transmission on parallel or serial networks or buses, in which case an intermediate register with two logically identical data areas is used for the change from the two-channel to the single-channel system.

On the basis of the change from the multiple channel system to the single-channel system, the German application with the file reference DE 10 2004 039932.8, which was submitted by the same applicant as the present invention on Aug. 17 2004, relates to a further approach to safe bus coupling of safety-relevant processes, in which freedom from action and independence are ensured for the creation of a safety-based protocol. The application with the file reference DE 10 2004 039932.8, whose entire disclosure is referred to here, in this case provides a method for single-channel bus coupling for a safety-critical process, in which a data record which is relevant for the safety-critical process is processed via at least two redundant processing channels in accordance with identical rules for in each case one safety-based protocol, and the redundant safety-based protocols for single-channel bus coupling are combined again to form a common safety-based protocol, to be precise by each of the processing channels accessing a common intermediate register, with write authorization being allocated only once for each register location, in such a way that the common safety-based protocol, that is to say the safety message to be transmitted, is composed in elements by in each case writing different elements of the respective safety-based protocols.

One object of the present invention is to provide a way to couple widely differing fieldbus or network systems each having their own safety mechanisms in such a way as to ensure the transmission of safety data between at least two bus/network systems with different safety mechanisms.

The solution according to the invention is achieved in a very highly surprising manner just by a subject matter having the features of one of the attached independent claims.

Advantageous and/or preferred embodiments and developments are the subject matter of the respective dependent claims.

Thus, according to the invention, for coupling at least two (field)bus/network systems each having different safety mechanisms, in particular each having proprietary safety mechanisms, the invention provides for safety data which is to be transmitted between the different system-based safety mechanisms to be processed additionally using a safe data structure which is defined but is system-independent.

An apparatus according to the invention for coupling at least two (field)bus/network systems which each have different safety mechanisms, in particular in each case proprietary safety mechanisms, for conversion of safety data to a system-dependent safe data structure and/or vice-versa, for this purpose comprises at least one first and one second safety-based data processing module for processing safety data to be transmitted between the different system-based safety mechanisms using a safe data structure which is defined but is system-independent.

In consequence, one major advantage of the invention is that a safe communication relationship, which is independent of any (field)bus/network system and is thus essentially local, can be set up in a simple manner between widely different (field)bus/network systems, avoiding direct conversion between two different safety mechanisms of different (field)bus/network systems with the safe conversion mechanisms which are in each case required for this purpose and must be adapted differently. It is thus for the first time possible in this way to also couple (field)bus/network systems which each have proprietary safety mechanisms.

For the purposes of the invention, the expression "proprietary" in this case, in the following text and in the claims in general refers to hardware or software which can be used on only one system and is not compatible with other hardware or software of a related type.

For this purpose, provision is expediently made for each of the data processing modules to be coupled to one of the system-based safety mechanisms, in which case at least the at least one data processing module is designed to convert safety data which is to be transmitted and is in the form of one or more channels to the safe data structure which is defined but is system-independent, and at least one other data processing module is designed for safety-based evaluation of the system-independent safe data structure in order to produce safety data in the form of one or more channels.

Each data processing module is preferably designed for conversion to both coupling directions, safety data which is to be transmitted between the systems can be converted in an extremely flexible and versatile manner from a system-dependent safe data structure, which is in the form of one or more channels, before being transmitted using the defined, but system-independent, safe data structure and/or safety data to be transmitted can be converted to a multiple-channel or single-channel system-dependent safe data structure after being transmitted using the safe data structure which is defined but system-independent.

In particular, the invention provides that a data structure which is in each case to be converted from one safe data structure to another safe data structure is advantageously first of all evaluated on a safety basis, and a data record, which has been evaluated, is in the form of one or more channels after evaluation and comprises "raw data" is converted to the respective other safe data structure. The safe data processing modules are thus essentially decoupled from any system-dependent safety requirements.

In one particularly preferred embodiment, furthermore, the safety data which is processed additionally using a safe data structure which is defined but is system-independent is transmitted within a unit, which is involved with a process to be controlled, of one of the systems to be coupled, to be precise between a safety-related device, which processes safety data that is relevant for this process, of the unit and at least one (field)bus/network connection of the unit. For this purpose, the data processing modules are expediently integrated in the unit which is involved with the process to be controlled in such a way that at least one of the at least two data processing modules is integrated in the safety-related device, and at least one other of the data processing modules is integrated with the (field)bus/network connection.

One particularly preferred embodiment provides that a set of input/output data, which is in the form of one or more channels, of the process to be controlled is converted to the safe data structure which is defined but is system-independent, or is obtained from the safe data structure which is defined but is system-independent by evaluation of that safe data structure which is defined but is system-independent. For this purpose, at least one data processing module which is integrated in the safety-related device is expediently designed for conversion of safety data, which comprises a set of input/output data in the form of one or more channels, for the process to be controlled to the safe data structure which is defined but system-independent, and/or to evaluate the safe data structure which is defined but system-independent for single-channel or multiple-channel production of a set of safety data comprising input/output data.

For this purpose, the unit may be a subscriber unit which comprises at least one single-channel or multiple-channel input and/or output for connection of a process to be controlled, such that safe inputs/outputs to a safety-relevant process can also be included using the invention. If safe inputs/outputs can be included via the safety-related device, this safety input data may be in the form of "raw data" at this stage. However, the unit may also be a control unit which, for example, generates safety data to be processed. Thus, in consequence, it is also advantageous to ensure the inclusion of both bus/network-based safety data and safety data which is based on local inputs/outputs in the coupling according to the invention of different safety mechanisms.

Essentially each existing bus subscriber unit or bus control unit can thus be adapted just by minor modifications for the extremely flexible coupling according to the invention of different systems, and can thus be provided with integrated gateway functionality, as well. Units such as these which are designed to carry out the method according to the invention also, on an application-specific basis, have modular units, for example INLINE units, and the bus/network connection can in consequence also be integrated in an INLINE station that is formed by the unit.

The displacement of the respective proprietary communication system for safe data transmission from the safety-related device results in the further advantage of considerably better performance, since the safety-related device is not loaded, or is only slightly loaded, with these communication tasks and, for example; this has a further positive effect on delay times for TCP/IP stack or Profinet.

The conversion to the data structures which are safe on a system-independent basis is preferably carried out in a protected form for a single-channel transmission, preferably in accordance with the safety functionality disclosed in DE 10 2004 039932.8, in which case essentially any desired hardware structures which are not safe, for example microprocessors such as USC4, serial buses such as $I^2C$ or SPI, and/or a plurality of coupling memories of intermediate registers, for example in the form of DPMs (dual port memories) can also be used within the unit for the transmission of data structures protected on a system-independent basis in this way between respective data processing modules, in an expedient and cost-saving manner.

In order to protect data structures which are safe on a system-independent basis, the data processing modules in consequence preferably comprise at least two redundant, interacting module units, with the module units being coupled on the output side to a non-safe coupling component by means of this non-safe coupling component for transferring a data structure which is jointly protected on a system-independent basis, and/or be coupled on the input side with a non-safe coupling component for safety-based reading of a data structure, which is protected on a system-independent basis, from this coupling component.

In order to satisfy the safety requirements, the internal communication connection is protected via a non-safe component which, in a further preferred embodiment, is based in a single channel form on safe control of a unit which is involved in a safety-critical process, and the units mounted downstream from this by means of safety mechanisms, which are listed in IEC 61508, for variable memory areas and communication interfaces in accordance with SIL 3, that is to say in particular by means of CRC, compliance with time expectations and time-out mechanisms.

The invention thus in a simple manner allows safety-based integration of specific safety-related devices, for example of a safe Interbus controller even in units with different (field)bus/network interfaces. The provision of a unit designed according to the invention with integrated safe gateway functionality to different network systems is also within the scope of the invention.

The data processing modules may be formed on an application-specific basis by hardware and/or software such that they can be integrated in units based on widely differing systems with just minor modifications to already in-use communication firmware and essentially without any modification to hardware structures.

The invention thus in general allows the coupling of unit with a specific safety-related device to other safety-related communication systems, in which case it is also possible to effectively use proven techniques and methods, with appropriate modification, thus ensuring a high level of reuse and a high level of modularity. Thus, for example, a unit with a safety-related device based on the INTERBUS, for example a safe controller which is integrated as a plug-on board or in the layout for a unit which is involved in a safety-critical process can be coupled to other safety-related communication systems, such as CAN SAFETY, PROFISAFE, or the like.

The invention thus also covers a computer-legible medium with information stored in it which, read by a computer, in particular by a computer for a bus or network unit which is involved in a process to be controlled, will interact with the computers in order to carry out the method according to the invention.

The invention will be described in more detail in the following text using preferred exemplary embodiments and with reference to the attached drawings, in which:

DETAILED DESCRIPTION

The coupling according to the invention will be described in the following text by way of example with reference to a safety-related device of a unit which is involved in a process to be controlled, with a bus/network with a proprietary safety mechanism, in particular with reference to a bus with a CAN-based safety mechanism and an INTERBUS-based safety-related device for processing safety data in order to control a unit which is involved in a safety-critical process.

First of all, reference will be made to FIGS. 1a and 1b, which show two highly simplified function diagrams of bus subscriber units designed according to the invention, which each provide direct adaptation of a two-channel hardware structure of an integrated safety-related device to a different safety-related fieldbus connection according to the invention.

Figure 1A:
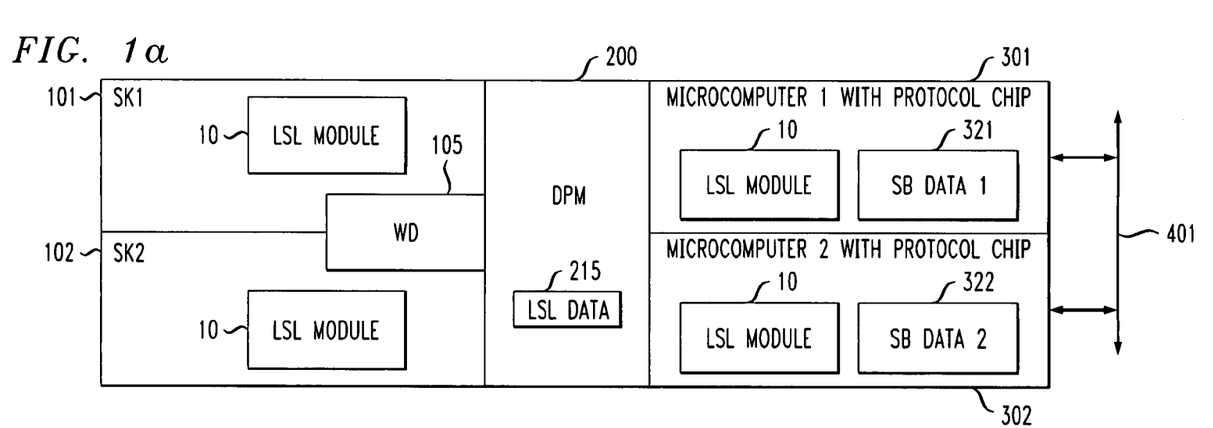
FIGS. 1a and 1b show two highly simplified function diagrams, in each case of a direct adaptation of a two-channel hardware structure of a safety-related device of a unit which is involved in a process to be controlled to a fieldbus connection for a fieldbus with a different safety-based mechanism according to the invention.

In general, one embodiment is in this case sketched in FIG. 1a, in which two fieldbus nodes or protocol chips operate in a redundant manner on a fieldbus 401 which itself has a proprietary safety mechanism, for example in the case of different CAN solutions. In this illustrated embodiment, as is shown by the reference symbols 301 and 302, microprocessors iC1 and iC2 which are coupled to the bus 401 integrate the respective protocol chip, via which safety-based (SB) data items 321 and 322, which are formed with the proprietary safety mechanism, are injected into the bus 401, or are output from the bus 401. In FIG. 1b, just one fieldbus node or protocol chip 313, to which two microprocessors iC1 and iC2, 311 and 312, respectively, are connected acts on the bus 402 of a system with a proprietary safety mechanism, that is to say for injection and outputting SB data items 331 and 332 which are formed by a proprietary safety mechanism, so that, in this case, a transition is thus provided between a two-channel-system and a single-channel system, for example in the case of Profisafe. Thus, both in FIG. 1a and in FIG. 1b, a proprietary safety mechanism for bus coupling is thus provided with two redundant computers or processing channels in order to create a safe protocol for bus injection and for evaluation of the safe protocol for bus outputting.

The procedure which will be described in the following text with reference to FIG. 1a relates to bus injection of safety data items which are obtained via two safe channels SK1 and SK2, which process input/output data identified by the reference symbols 101 and 102, for the safety-related device. The safe channels 101 and 102 in one practical embodiment in this case each comprise a CPU with the necessary peripheral components. An associated watchdog 105 monitors and ensures suitability for function.

In the case of a bus subscriber unit as shown in FIG. 1a, each of the safe channels 101 and 102 which process the safety data is connected to input and/or output units, such as sensors and/or actuators, which are not illustrated but are associated with the safety-critical process to be coupled thereto. Identical input data items which are relevant for the safety-critical process are preferably made available to the safe channels 101 and 102 for a bus subscriber unit with a sensor-end application, with these input data items expediently initially being stored. Particularly in the case of a bus control unit, input data to be protected is located, for example, in appropriate memories.

The redundant input data items are then processed by means of integrated LSL module units, which are identified by 10 for the safe channels 101 and 102 to form common data items with a locally protected data structure, that is to say a data structure which is protected independently of the (field) bus/network system. This data or protocol structure which is protected independently of the (field)bus/network system is referred to in the following text as the LSL (Local Safety Layer).

Subject to the preferred use of a safety mechanism which is disclosed according to the German application DE 10 2004 039932.8, which has been referred to, the input data items, which are in the form of raw data items, are first of all processed in a redundant form using the same rules for in each case one safety-based protocol, which are identical provided that no errors, faults or failures occur during the calculation, and satisfy the requirements of the standard for safety-based transmission. A common LSL is then worked out from the redundant safety-based protocols, so that LSL data items, which are identified by 215, can then be transferred on a single channel basis, for example based on a point-to-point connection, to the fieldbus/network connection with a variable data length for the proprietary system to be coupled thereto.

The LSL data items 215 which are protected by means of the LSL can thus be transferred via non-safe hardware structures and are formed, using the safety mechanism disclosed in the German application DE 10 2004 039932.8, by means of element-by-element combination of data items of the redundant safety-based protocols in a buffer store or intermediate register, which is identified by the reference symbol 200, such as the DPM that is shown.

The safety analysis of the redundant architecture with respect to the LSL module units 10 can thus be ended initially by the storage of the LSL data items 215 in the non-safe memory 200. This is where the safety mechanism LSL comes into action, because the errors or faults which are possible from this point on are considered and must be coped with as before for the rest of the transmission. One error which can occur in this context from the principle for the checking and certification of "Bus systems for the transmission of safety-relevant messages" is message corruption.

At the respective fieldbus connection of the bus subscriber unit, the LSL data 210 is, however, first of all once again evaluated on a safety-basis by LSL module units 10 in accordance with the LSL definition. This evaluation is preferably carried out, as shown in FIGS. 1a and 1b, with two-channel redundancy, with or without diversity. The evaluated data items are then introduced, once again as raw data items, into the actual safety-based proprietary bus network protocol. The proprietary safety mechanisms of the respective coupled safe system then apply, on the basis of which the corresponding safe SB data items 321 and 322 as shown in FIG. 1a, or 331 and 332 as shown in FIG. 1b, are produced from the raw data items and are injected into the respective bus 401 or 402.

Figure 1B:
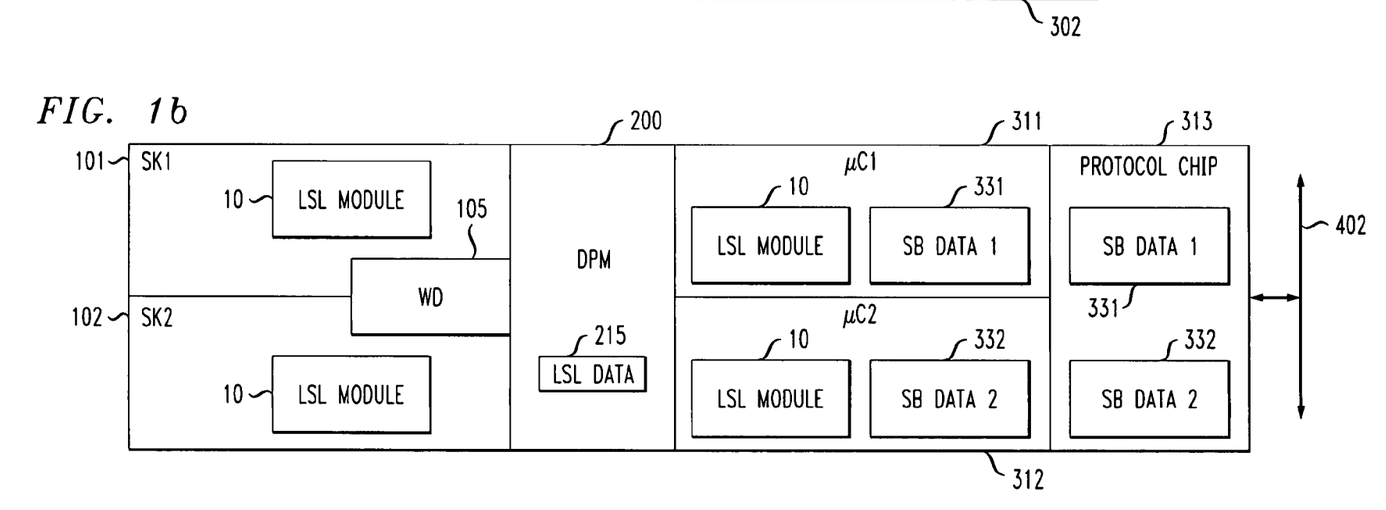

The communication path in the opposite direction, which is likewise covered by the invention, of SB data items 321 and 322 as shown in FIG. 1a or 331 and 332 as shown in FIG. 1b, which are to be output from the bus 401 or 402, in the direction of the safe channels 101 and 102 to associated output units is provided in essentially the same way, but vice-versa.

Data structures which are safe on a system-dependent basis are thus evaluated first of all on a safety basis via the respective proprietary safety mechanisms, and the evaluated and "raw data items" are then converted to the system-independent safe LSL data structure, for transmission between the corresponding field bus connection and the safety-related device, by means of the LSL module units 10 which are integrated therein.

A defined or definable access rule is thus preferably provided for the element-by-element combination of the safety-based protocol, which is in a redundant application-specific form, or possibly on an application-specific basis for the element-by-element combination of the redundant raw data items in order to form an LSL, which is to be transmitted on a single channel, using the safety mechanism as disclosed in the German application DE 10 2004 039932.8, which access rule admittedly gives the LSL module units 10 full read rights to the buffer store 200, but controls writing rights to the buffer store 200. In this context, the access rule stipulates that, from each of the redundant LSL module units 10, only the parts of the respectively calculated safety-based protocol for the formation of the LSL can be written to the corresponding memory locations in the buffer store 200 for which the respective LSL module units 10 in each case have writing authorization. Thus, according to the invention, only one writing authorization is preferably defined in each case for one communication direction for each memory or register location.

Thus, on the one hand, both LSL module units 10 are in each case able to calculate all of the LSL data items, so that this has a positive effect on the required length of the data structure, since all of the data bits with the various safety mechanisms are already known in the redundant LSL module units 10, and no additional data bits need to be transmitted to allow the correct calculation to be deduced at the receiver end. Furthermore, this ensures that one of the LSL module units 10 on its own is not able to send an LSL, with the control of the authorization to write data, which can in each case be allocated only once, in a register cell representing an option which can be implemented easily and is highly efficient in order to ensure cost-effective, considerably increased safety independently of the LSL and of a system that is being used.

Complete read access to the buffer store 200 allows all of the data items to be compared in a simple form in that, on the one hand, it is easily possible to check whether the jointly formed LSL which, for example, satisfies the safety requirements for single transmission in accordance with SIL 3 IEC 61508 is error-free, to be precise by respective verification against its own safety-based protocol which is formed separately in advance. Furthermore, the completely comprehensive read access for each of the LSL module units 10 makes it possible to carry out a check, which can expediently be carried out as a primary item in the control/monitoring/regulation of a safety-critical process, to determine whether the access rule is in general carried out without errors. For this purpose, in particular, a check is carried out to determine whether the calculated data items are written to one of the respective module units 10 of the redundant processing channels exclusively, although this is guaranteed only to the respectively assigned memory addresses in the buffer store 200.

Furthermore, complete read access to the buffer store 200 allows the LSL data items 210 to be evaluated by each LSL module unit 10, with subsequent mutual comparison for correctness.

With regard to further embodiments relating to this, reference is once again made to the disclosure in the application DE 10 2004 039932.8.

The use of the invention thus ensures a flexible, bus-independent modular safety-based communication and hardware structure in a bus subscriber/bus control unit. Furthermore, a high level of reuse as a platform is ensured, particularly in the case of a safety-related device which has a programming interface and is integrated or can be integrated in a bus subscriber/bus control unit such as this. In consequence, the invention allows rapid coupling to existing or future fieldbus/network systems, with the high performance of the safety-related device of the bus unit being maintained, since the communication is moved with the (field)bus/network system to be coupled thereto.

Furthermore, the use of the invention allows gateway functions to be provided in a simple manner between widely different proprietary safety-based (field)bus/network systems, as will be described in more detail in the following text using the example of an additional CAN safety application together with INTERBUS safety communication.

Figure 2:
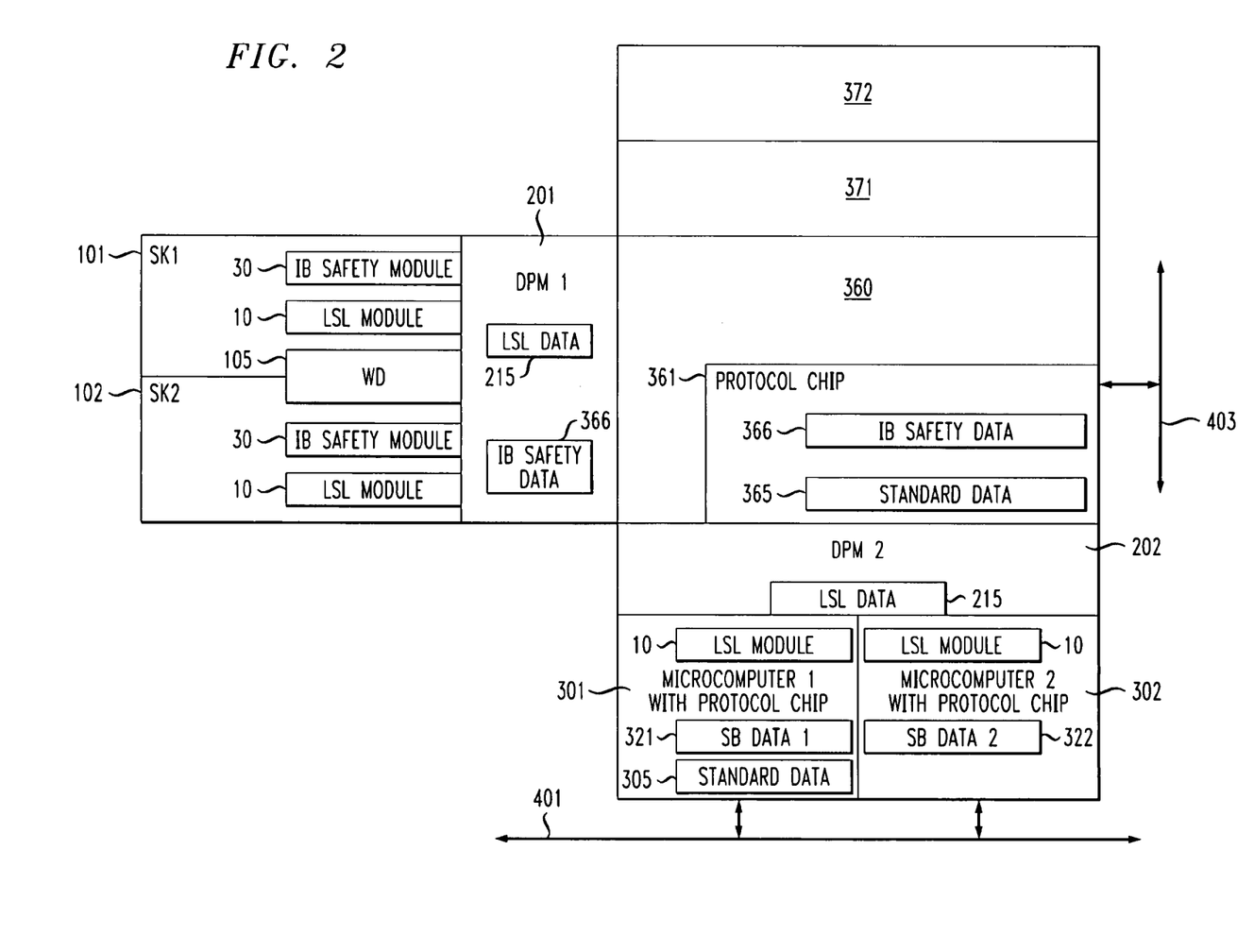
FIG. 2 shows a highly simplified function diagram of an example of an implementation of a gateway between two different safe fieldbus systems according to the invention.

First of all, reference is made for this purpose to FIG. 2, in which identical reference symbols denote identical or functionally identical components. As can be seen from FIG. 2, the safety-related device of a correspondingly adapted bus subscriber unit integrates redundant LSL module units 10 in addition to redundant IB safety module units 30, which build on an INTERBUS safety protocol with the redundant safety channels 101 and 102.

A non-safe first DPM is coupled to the safety-related module units 10 and 30 as a coupling memory 201 for recording/transferring the LSL data items 215, which are protected via the LSL, and the IB safety data items 366, which are protected by the INTERBUS safety protocol. The coupling memory 201 is connected to an INTERBUS-specific control unit or CPU 360 with an integrated or external protocol chip 361, thus providing a first INTERBUS-based fieldbus node for an INTERBUS safety bus 403. Safety data items which are to be output or injected from or to the bus 403 via the protocol chip 361 are based on the INTERBUS safety protocol, and are correspondingly in the form of IB safety data 366. In addition, non-protected standard data items 365 can be injected and output via the protocol chip 361.

A further DPM is connected to this INTERBUS-specific control unit or CPU 360 as an additional coupling memory 202 to which a safety-based CAN bus connection is fitted. However, the coupling can also be made via other media, for example by means of SPI, Wireless, Multi Port Memory, PCI express.

The safety-based CAN bus connection is designed essentially as described with reference to FIG. 1a, in which case standard data items 305 which are not protected can also be injected and output via the iC1 with the integrated protocol chip 361. The safety mechanisms described above can be used once again in a corresponding manner for the change from the coupling memory 202 to the two-channel structure of the CAN bus connection.

A further coupling memory 371 can optionally be connected to the INTERBUS-specific control-unit or CPU 360 with, for example, a further optional (safe) control system 372 being provided on it.

A data flow, which is based on the function diagram shown in FIG. 2, between an IB safety data structure and the specific data structure of a further system with a proprietary safety mechanism or between the specific data structure of the further system with a proprietary safety mechanism and the IB safety data structure will be described by way of example in the following text with reference to FIGS. 3a and 3b, with the area which comprises non-safe hardware structures being annotated "NS", and the safe area being annotated "S".

Figure 3A:
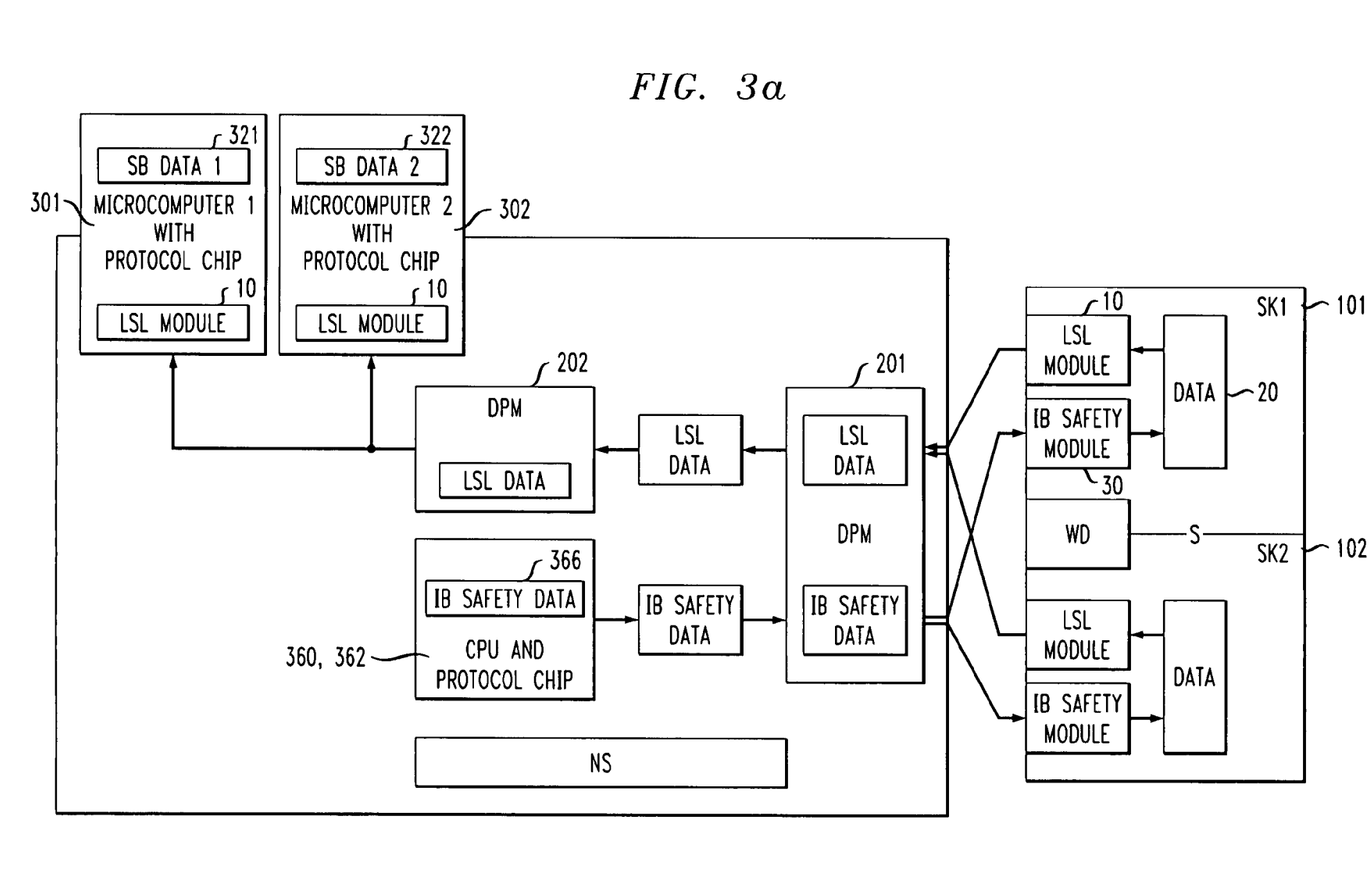
FIGS. 3a and 3b show two highly simplified function diagrams of one example of a data flow according to the invention between an IB safety and a system-independent safe data structure and between the system-independent safe structure and the IB safety data structure, based on the function diagram shown in FIG. 2.

In FIG. 3a, protected IB safety data 366 which is output via the INTERBUS-based fieldbus connection 360, 361 is supplied, for gateway functionality purposes, first of all to the coupling memory 201 in order to be passed on further, for example by means of a microprocessor that is not illustrated. From the coupling memory 201, the IB safety data 366 is read by the redundant IB safety module units 30 of the safety-based device, and is evaluated to form "raw data" items 20. These redundant "raw data items" are then processed by the redundant LSL module units 10 of the safety-related device to form locally protected LSL data items 215, and are once again supplied in a combined form to the coupling memory 201 in order to be passed on further on one channel. From there, the locally protected LSL data items 215 are supplied, for example by means of a microprocessor that is not illustrated, to the coupling memory 202 in order to be passed on further. From the coupling memory 202, the LSL data items 215 are read and evaluated by the redundant LSL module units 10 of the fieldbus connection for the system with a proprietary safety mechanism, for example for a CAN bus. In one alternative, application-specific embodiment, LSL data items 215 are read and then evaluated by the redundant LSL module units 10 of the fieldbus connection for the system with a proprietary safety mechanism, after being passed on to at least one further coupling device or directly from the coupling memory 201. The redundant "raw data items" which are evaluated during the change from the single-channel structure to the multiple-channel structure are then embedded in the safety-based proprietary protocol by means of the redundant microprocessors, which are coupled to the proprietary (field)bus/network system and each have an integrated protocol chip 301 and 302, and are injected into the system as SB data items 321 and 322 that are formed with the proprietary safety mechanism.

Figure 3B:
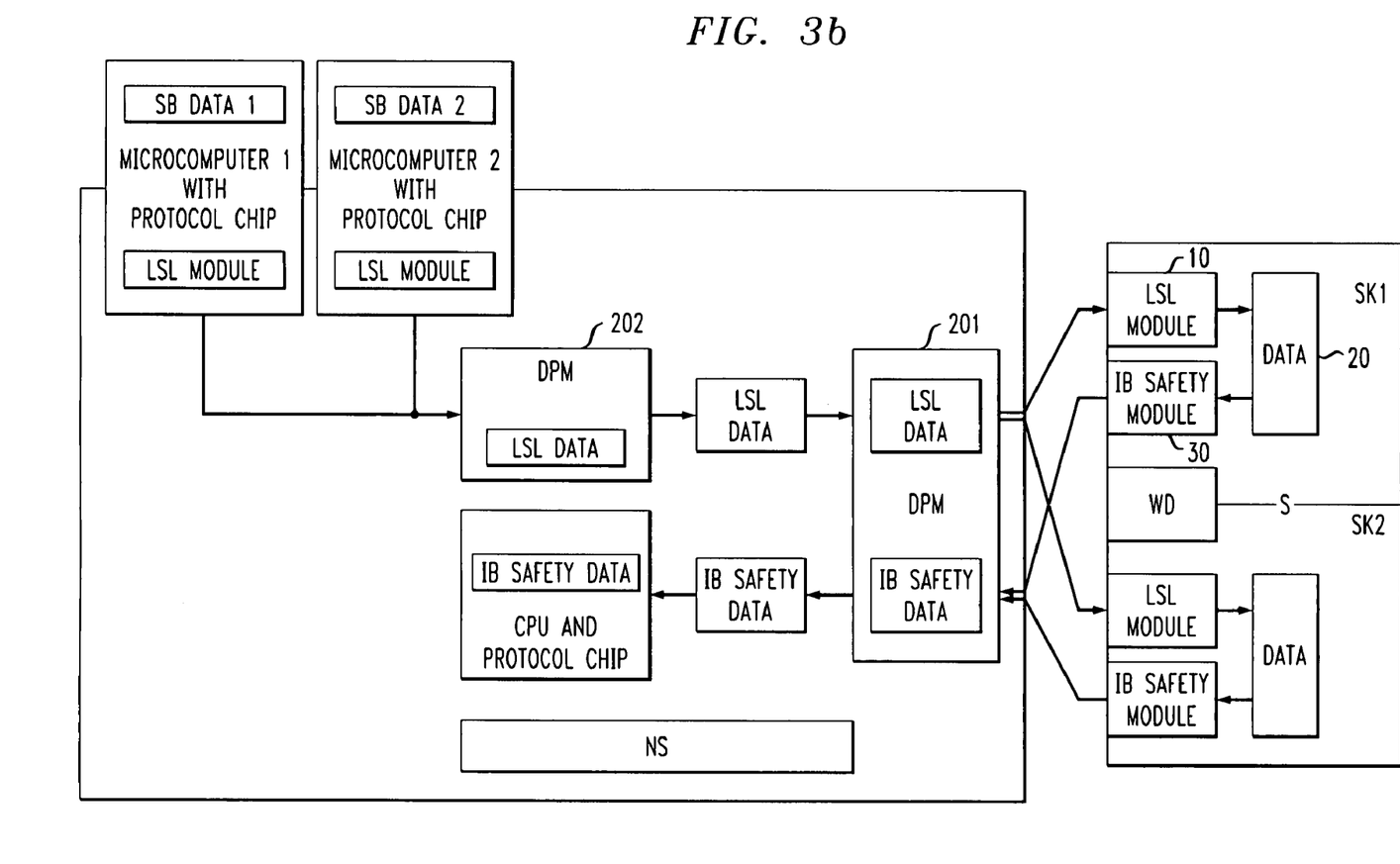

FIG. 3b shows the communication in the opposite sense. In a corresponding manner, protected SB data items are output via the fieldbus connection that is based on the proprietary safety mechanism are evaluated, and locally protected LSL data items are supplied in a corresponding manner via the safety-based LSL module units to the coupling memory 202, in order to be passed on further. After being passed on further to the coupling memory 201, the LSL data items are read from this memory by the redundant LSL module units 10 of the safety-related device, and are evaluated to form "raw data items" 20. These redundant "raw data items" are then processed by the redundant IB safety module units 30 of the safety-related device to form IB safety data items, and are once again supplied in a combined form to the coupling memory 201 in order to be passed on further on one channel. From there, the IB safety data items are transferred to the INTERBUS-based fieldbus connection, for bus injection.

The coupling memory 201 is thus used for one-channel transfer of data items which are protected on a system-specific basis, and are locally protected.

As described above, local inputs/outputs can also be connected via the safe channels 101 and 102, so that it is also possible to include local safety input and/or output data in the communication path according to the invention within the unit, which is possibly also a modular unit.

We claim:

1. A method for transmitting data between at least a first (field) bus/network system and a second (field) bus/network system, which are to be coupled, wherein for safety data to be transmitted within a system, the first system has different safety mechanisms for protecting the safety data and converting between the safety data and a safe data structure than the second system has, wherein the respective safe data structure depends on the safety mechanisms of the respective system, wherein safety data to be transmitted between the different system-based safety mechanisms is processed additionally using an independent safe data structure, wherein the independent safe data structure is a data structure that is defined independent of the (field) bus/network systems to be coupled and is configured to bypass the safety mechanisms of the (field) bus/network systems to be coupled, in such a way that the safety data, which is to be transmitted, is protected and converted to the independent safe data structure on a system-independent basis and after being transmitted the safety data is converted from the independent safe data structure.

2. The method of claim 1, wherein the safety data is converted from a system-dependent safe data structure (321, 322, 366), which is in the form of one or more channels, before being transmitted using the independent safe data structure.

3. The method of claim 1, wherein the safety data is converted to a multiple-channel or single-channel system-dependent safe data structure (321, 322, 366) after being transmitted using the independent safe data structure.

4. The method of claim 1, wherein, in each case, one data structure which is to be converted from one safe data structure to another safe data structure is evaluated (10, 20, 301, 302, 311, 312) on a safety basis, and a data protocol (20), which is in the form of one or more channels after evaluation, is converted (10, 20, 301, 302, 311, 312) to the corresponding other safe data structure.

5. The method of claim 1, wherein, the safety data which is processed additionally using said independent safe data structure (215) is transmitted within a unit, which is involved with a process to be controlled, of one of the systems to be coupled, to be precise between a safety-related device, which processes safety data that is relevant for this process, of the unit and at least one (field)bus/network connection of the unit.

6. The method of claim 5, further comprising, safety data which comprises a set of input/output data, which is in the form of one or more channels, of the process to be controlled, is converted to the independent safe data structure, or is obtained from the independent safe data structure by evaluation of that independent safe data structure.

7. The method of claim 1, wherein, the independent safe data structure is protected for single-channel transmission.

8. The method of claim 7, wherein, the data structure is protected using safety mechanisms in accordance with IEC 61508 and SIL 3.

9. The method of claim 1, wherein, the transmission is carried out using non-safe components (200, 201, 202).

10. An apparatus for transmitting data between at least a first (field) bus/network system and a second (field) bus/network system, which are to be coupled, wherein for safety data to be transmitted within a system, the first system has different safety mechanisms for protecting the safety data and converting between the safety data and a safe data structure than the second system has, wherein the respective safe data structure depends on the safety mechanisms of the respective system, comprising at least one first and one second safety-based data processing module (10) for processing safety data to be transmitted between the different system-based safety mechanisms using an independent safe data structure, wherein the independent safe data structure is a data structure that is defined independent of the (field) bus/network systems to be coupled and is configured to bypass the safety mechanisms of the (field) bus/network systems to be coupled, wherein each of the data processing modules (10) is coupled to a system-based safety mechanism (30, 301, 302, 311, 312), in which case at least the at least one first data processing module is designed to convert the safety data, which is to be transmitted, to the independent safe data structure, wherein the safety data is protected on a system-independent basis, and at least the at least one second data processing module is designed to convert the safety data from the independent safe data structure.

11. The apparatus of claim 10, wherein at least the at least one first data processing module is designed to convert safety data, which is to be transmitted and is in the form of one or more channels, to the independent safe data structure, and at least the at least one second data processing module is designed for safety-based evaluation of the independent safe data structure in order to produce safety data in the form of one or more channels.

12. The apparatus of claim 10, wherein, the data processing modules (10) are integrated in a unit, which is involved with a process to be controlled, of one of the systems to be coupled, with at least one of the at least two data processing modules being integrated in a safety-related device which processes safety data that is relevant for this process, and at least one other of the at least two data processing modules being integrated with a (field)bus/network connection in the unit.

13. The apparatus of claim 12, furthermore comprising at least one data processing module, which is integrated in the safety-related device, for conversion of safety data which comprises a set of input/output data, which is in the form of one or more channels, for the process to be controlled, to the independent safe data structure, or for safety-based evaluation of the independent safe data structure, for single-channel or multiple-channel production of a set of safety data comprising input/output data.

14. The apparatus of claim 12, wherein, the unit is a modular unit.

15. The apparatus of claim 12, wherein, the unit is a bus subscriber unit or a bus control unit.

16. The apparatus of claim 12, wherein, the unit is in the form of a unit with a gateway functionality.

17. The apparatus of claim 10, wherein, the data processing modules (10) are designed to process a data structure which is protected on a system-independent basis for single-channel transmission between, in each case, at least two data processing modules.

18. The apparatus of claim 17, further comprising at least one non-safe coupling component (200, 201, 202) in the transmission path for the single-channel transmission between respective data processing modules.

19. The apparatus of claim 10, wherein, one data processing module comprises at least two redundant, interacting module units (10), with the module units being coupled on the output side to a non-safe coupling component (200, 201, 202) for transferring a data structure, which is jointly protected on a system-independent basis, to this coupling component, and/or are coupled on the input side with a non-safe coupling component (200, 201, 202) for safety-based reading of a data structure, which is protected on a system-independent basis, from this coupling component thereto.

20. The apparatus of claim 18, wherein a non-safe coupling component comprises at least one microprocessor, serial bus and/or coupling memory (200, 201, 202), in particular in the form of a DPM.

21. The apparatus of claim 10, wherein the data processing modules (10) comprise hardware and/or software.

22. An article of manufacture, comprising a machine readable medium containing one or more programs which when executed implement the steps of: transmitting data between at least a first (field)bus/network system and a second field(bus)/network system, which are to be coupled, wherein for safety data to be transmitted, the first system has different safety mechanisms for protecting the safety data and converting between the safety data and a safe data structure than the second system has, wherein the respective safe data structure depends on the safety mechanisms of the respective system, wherein safety data to be transmitted between the different system-based safety mechanisms is processed additionally using an independent safe data structure, wherein the independent safe data structure is a data structure that is defined independent of the (field) bus/network systems to be coupled and is configured to bypass the safety mechanisms of the (field) bus/network systems to be coupled, in such a way that the safety data, which is to be transmitted, is protected and converted to the independent safe data structure on a system-independent basis and after being transmitted the safety data is converted from the independent safe data structure.

* * * * *